United States Patent [19]

Rubinstein

[11] 4,015,122
[45] Mar. 29, 1977

[54] PHOTO-ELECTRIC OBJECT DETECTION SYSTEM

[76] Inventor: Walter M. Rubinstein, 25535 Briar, Oak Park, Mich. 48237

[22] Filed: July 12, 1974

[21] Appl. No.: 487,898

[52] U.S. Cl. .............................. 250/221; 250/227; 340/258 B
[51] Int. Cl.² ...................................... G01D 21/04
[58] Field of Search .......... 250/221, 222, 208, 209, 250/227, 23 Y; 235/61.11 E, 92 V; 340/258 B

[56] References Cited

UNITED STATES PATENTS

| | | | |
|---|---|---|---|
| 3,183,499 | 5/1965 | Cowen | 250/221 X |
| 3,602,640 | 8/1971 | Maillet | 250/227 |
| 3,746,863 | 7/1973 | Pronovist | 250/221 |
| 3,764,813 | 10/1973 | Clement et al. | 250/221 |
| 3,786,265 | 1/1974 | Abilock et al. | 250/209 |
| 3,805,061 | 4/1974 | De Missimy et al. | 250/221 X |
| 3,810,148 | 5/1974 | Karsten et al. | 250/221 |
| 3,811,648 | 5/1974 | Ream, Jr. et al. | 250/578 X |

Primary Examiner—Saxfield Chatmon, Jr.
Assistant Examiner—David K. Moore
Attorney, Agent, or Firm—Krass and Young

[57] ABSTRACT

A photo-electric light curtain for braking and terminating power to the ram of a press when an obstruction is detected in the curtain area uses an elongated fluorescent lamp as the light source. A number of spaced lens systems arrayed on the opposite side of the curtain area from the lamp focus on spaced points along the lamp. Fiber-optic strands connect the focal point of each of the lens systems with points arrayed about the stationary element of a circular commutator which are scanned by another fiber-optic element having one end affixed to a rotary commutator element and the other end feeding a photodetector. The output signals from the photodetector are processed to detect obstructions along the focal axis of any of the lens systems by fail-safe digital circuitry which provides an output when this blockage is detected for several cycles of the commutator. Counter circuitry, preset by manual switches, allows the system to ignore light blockages caused by permanent installations.

6 Claims, 9 Drawing Figures

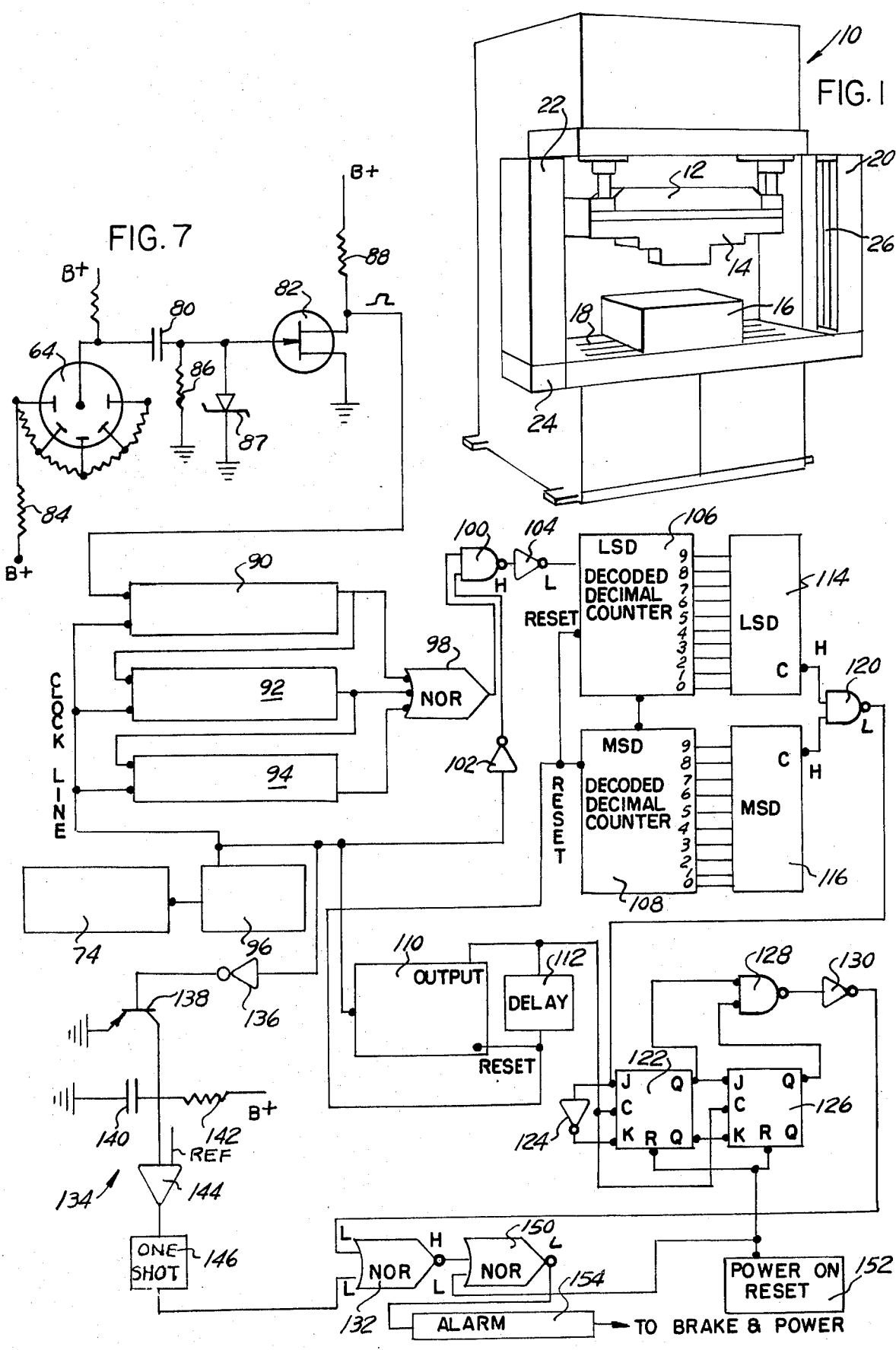

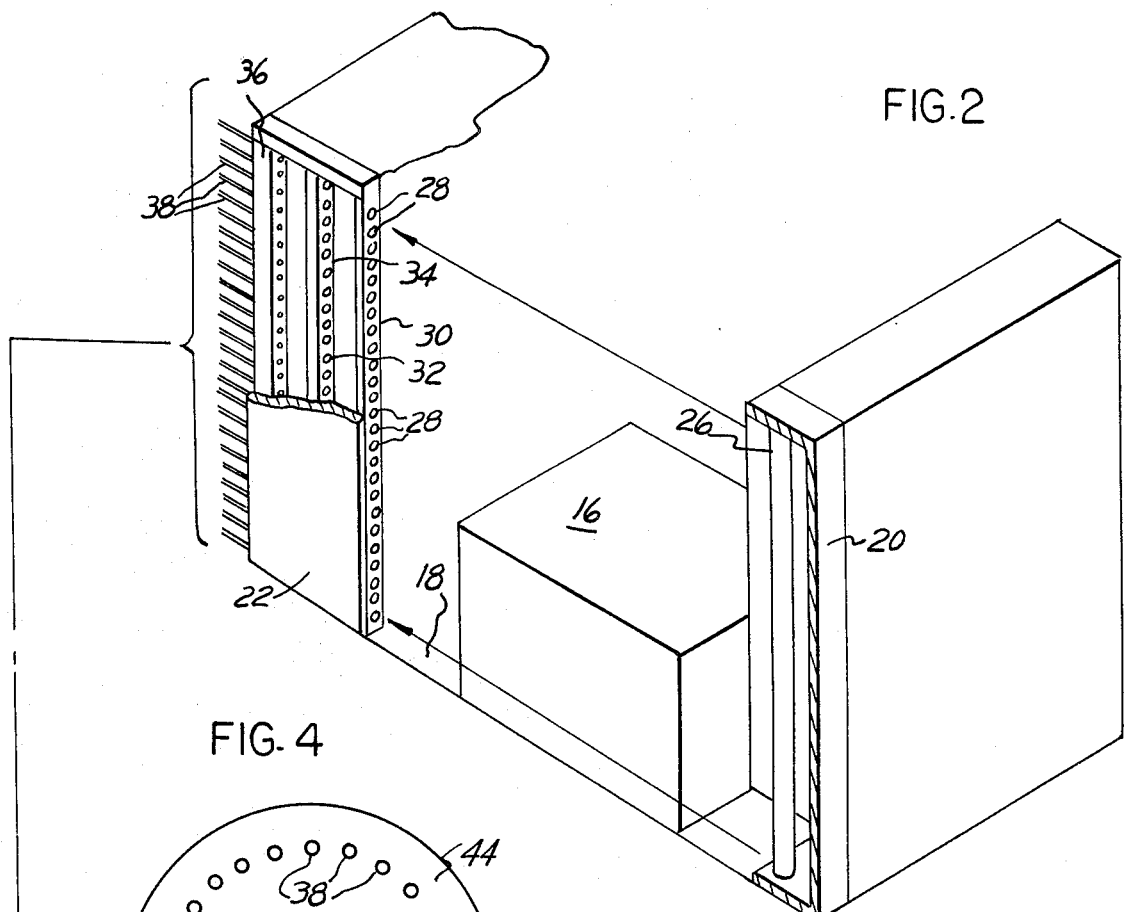
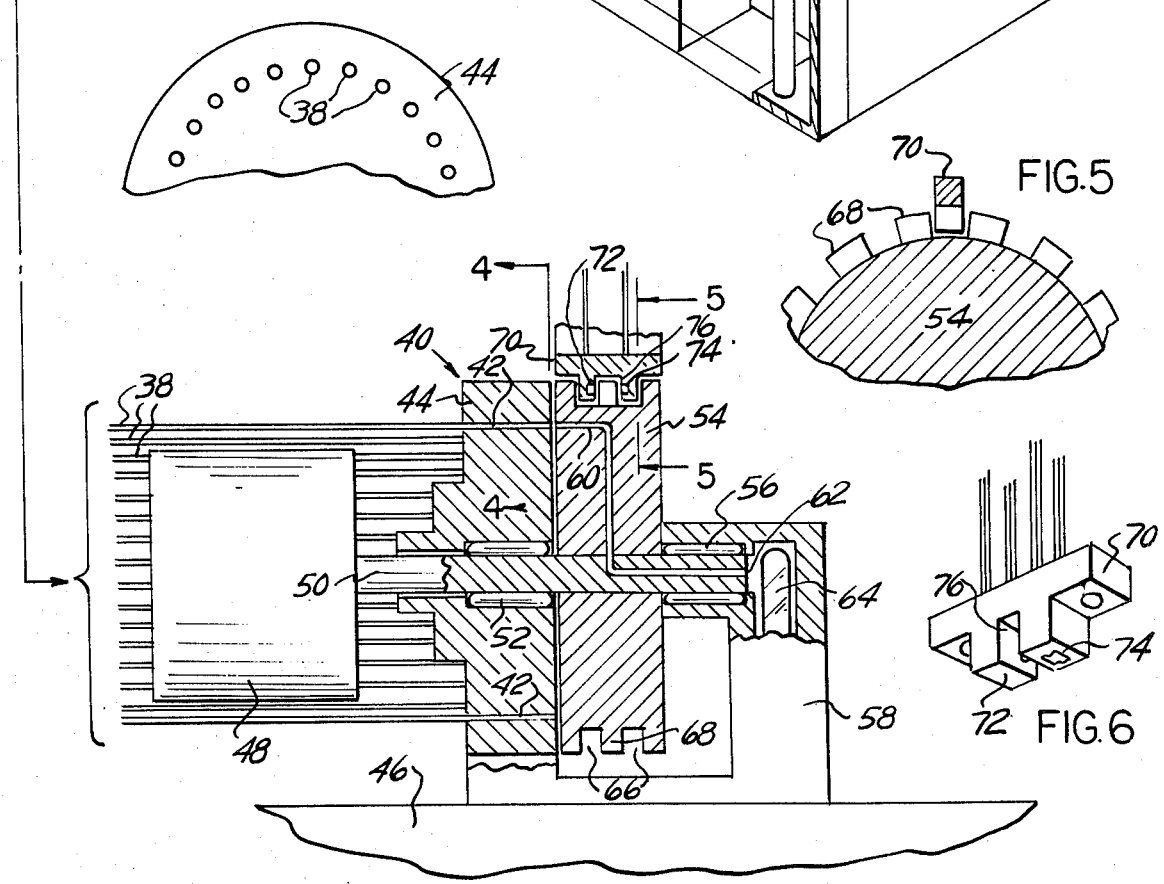

12 # PHOTO-ELECTRIC OBJECT DETECTION SYSTEM

BACKGROUND OF THE INVENTION

1. Field of the Invention

This invention relates to electronic systems for disabling the operation of machinery when an object is detected in a danger area and more particularly to photo-electric systems of this type.

2. Background of the Invention

A variety of systems exist for detecting the presence of a foreign object in the area of moving parts in machinery in general and in presses, saws, molding machines, etc., in particular, in order to prevent the operator or others in the proximity from being harmed by the operation of the machinery. Photodetectors are often used to sense an obstruction in a light path to trigger the power disconnect apparatus in these safety devices; however, devices that only sense obstruction along a line path have proven inadequate for safety purposes and good practice as well as government regulations require that dangerous machines be equipped with safety devices to disable the machine when a foreign object is inserted into the danger area from any direction. Systems have therefore been developed which provide curtains of light to guard the danger area. An object inserted into the curtain at any point will trigger the disabling of the operating machine.

These light curtains have typically employed a plurality of photodetectors, each sensing a different one of a series of light beams disposed parallel to one another so as to define a plane. The high cost of this approach had led to efforts to use a single photodetector, or other radiation detector, to protect a large area by reflecting a single beam along a zig-zag path or by using a rotating mirror to cause a single beam to reciprocate along the protected path. The present invention provides a light curtain system of the type employing a single photodetector which is unique in configuration so as to be relatively simple in construction and reliable in operation.

SUMMARY OF THE INVENTION

The preferred embodiment of the present invention employs a plurality of identical lens systems, each focused at infinity, to detect light emanating from different points on a common elongated light source, preferably taking the form of a fluorescent lamp tube. One end of a flexible optically conductive fiber strand is supported at the focal point of each lens system and the opposite ends of each of the fibers are supported at spaced points along a circular stationary commutator element. A rotary element of the commutator carries a single optical conductive strand along a circular path so that its end is successively brought into alignment with the ends of each of the fibers leading from the lens systems. A photodetector is positioned to receive the output of the single scanning fiber strand so as to sense the light output from each of the lens systems sequentially.

The principal axes of the lens systems are arrayed parallel to one another and intersect separated points on the single light source, creating in effect a plane of closely spaced lines. An obstruction inserted between the light source and the lens systems will block the light received by one or more lenses and this condition will be sensed by the photodetector.

The control system which receives the output of a photodetector and controls the application of power to the protected operating machine is digital in nature and the output of the photodetector are converted into binary signals indicative of either a full output or the absence of an output from a photodetector when the commutator strand is at a given scan location. The occurrence of coincidence between the scanning optical strand and one of the stationary strands is indicated by timing signals generated by a sawtoothed section on the commutator. The photodetector output signals, gated by the timing signals, are fed into three serially connected shift registers, each having a number of stages equal to the number of lens systems. The outputs of each of the shift registers are gated together so that an alarm signal is only generated when the photodetector senses the absence of a light signal at three successive scans of a particular light detector. This provides the system with immunity from electrical noise pulses and the scanning rate of the system is sufficiently high so that no danger is created by this slight delay in operation of the system.

In order to allow the system to be used without permanent alteration when temporary obstructions such as mechanical loading devices are supported in the light curtain area, circuitry is provided for counting the number of light paths that are obstructed and comparing that number with a number preset into the system with switches. The alarm signal is only generated when the number of obstructed areas differ from this preset number.

Circuitry is also provided for monitoring the speed of rotation of the commutator and generating an alarm signal when that speed falls below a certain point.

As my system monitors the blockage of the straight line paths between each of the lens systems and the fluorescent light source it is immune to the effects of ambient light unless the foreign light is actually disposed in the curtain area. This system may thus be used in normal factory lighting without requiring a special shielding.

In an alternative embodiment of the invention, rather than scanning the outputs of the lens systems with a rotating commutator an electrically controlled shutter element is disposed in the optical path of each lens system and fiber-optic elements permanently connect the focal planes of the lens systems to the photodetector. The shutters are then electrically actuated sequentially to open one at a time. This arrangement eliminates the necessity for the moving commutator.

In still another embodiment a plurality of discrete light sources are employed rather than the continuous light source formed by the fluorescent lamp in the preferred embodiment of the invention and these light sources are sequentially energized so that the plural light paths between these sources and the lens sets may be examined. In this embodiment the outputs of the lens sets are also permanently connected to a single photodetector through fiber optic elements.

While the embodiments of the invention subsequently described all use photodetectors and visible light sources, it should be recognized that other forms of radiation, such as infra-red or millimeter waves, with suitable detectors, could be used with alternative forms of the invention.

The system of the present invention is easy to mount on existing machinery since the lens systems and the fluorescent light need only be disposed in substantially the same plane, and in generally parallel relationship, and no critical alignment problem is presented.

The system is also relatively inexpensive since only a single photodetector is used. The reliability of this system is enhanced because of its simplicity.

Other objectives, advantages and applications of the present invention will be made apparent by the following detailed description of the preferred embodiment of the invention. The description makes reference to the accompanying drawings in which:

FIG. 1 is a perspective view of a metal-working press equipped with a light curtain safety device formed in accordance with the preferred embodiment of the invention;

FIG. 2 is a perspective drawing of the optical structure of the light curtain forming the preferred embodiment of the invention, as located on the press, partially broken away for purposes of illustration;

FIG. 3 is a sectional view through the commutator of the preferred embodiment of the invention;

FIG. 4 is a partial sectional view of the stationary element of the commutator taken along line 4—4 of FIG. 3;

FIG. 5 is a view through the timing pulse generator element of the commutator, taken along line 5—5 of FIG. 3;

FIG. 6 is a perspective view of the opto-isolator element used to generate timing pulses;

FIG. 7 is a schematic view of the control circuitry employed with the preferred embodiment of the invention;

Figure 8:
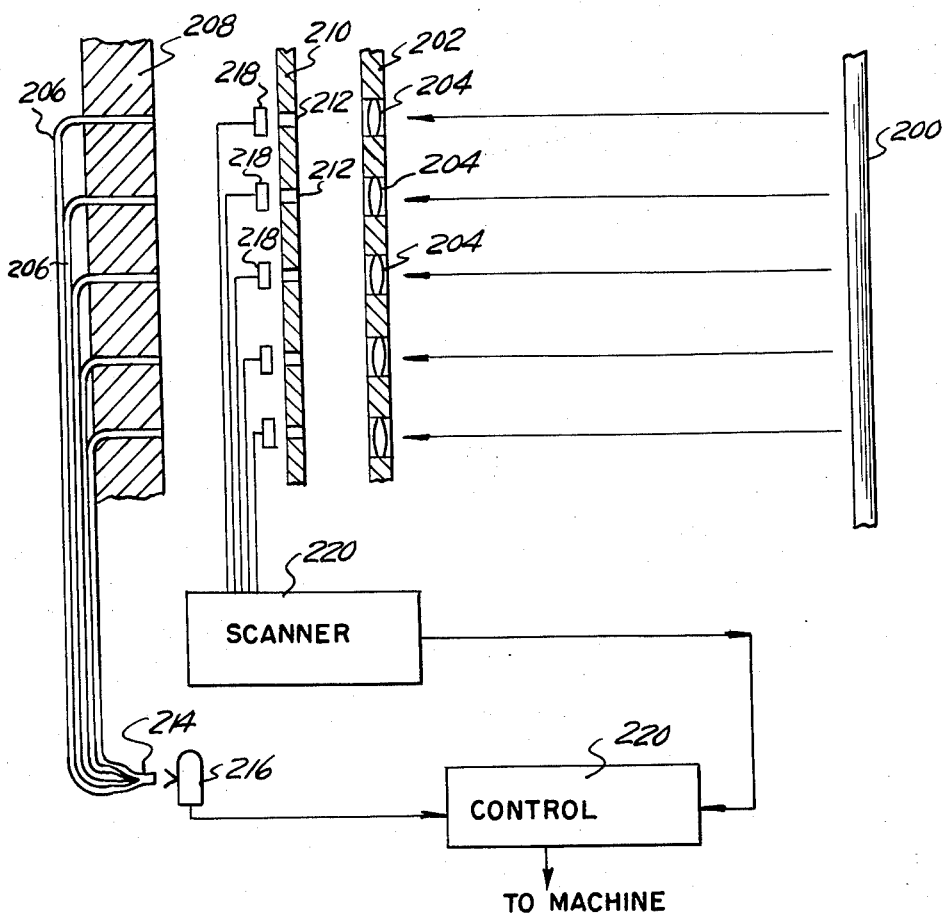
FIG. 8 is a schematic diagram of an alternative embodiment of the invention employing scanned shutters rather than the commutator of the embodiment in FIGS. 1–7.

Referring to the drawings the preferred embodiment of the invention is used in connection with a metal working press, generally indicated at 10, having a ram 12 adapted to support an upper dye half 14 to bring it in and out of operating engagement with a lower die half 16 supported on the press bed 18. The press is illustrated as being of the hydraulic type but the invention may be used with a mechanical press, and, in fact, with any form of operating machine that creates a hazard for the operator.

The light curtain of the present invention is formed between an elongated light source 20 and an elongated light receiver 22. The source 20 and the receiver 22 are both disposed vertically, generally parallel to one another, on the opposed sides of the press frame so as to bound the area providing access to the dies. In operation, the light source 20 and receiver 22 cooperate to detect the presence of any object of appreciable size in the area between them and to provide control signals for the appropriate press brake and drive mechanism to prevent closure of the press while an obstruction exists in the guarded area.

The output signals from the light receiver 22 are provided to an electronic control system housed in a panel 24 for processing. The control system generates the appropriate alarm signals for control of the press.

As best seen in FIG. 2 the light source 20 preferably takes the form of an elongated fluorescent lamp 26. The lamp may be powered in a conventional manner directly from the available power line but preferably a high frequency power supply of conventional design is provided for the lamp to prevent flicker from interfering with the system. Incandescent or solid state light sources might alternatively be used with this system.

FIG. 2 illustrates the light receiver 22 with sections broken away for purposes of illustration. The receiver employs a plurality of lenses 28, of double convex form, supported in an elongated vertically disposed frame member 30. The frame member 30 forms a face of the receiver 22 in direct opposition to the light source 20. In the preferred embodiment of the invention the lenses are spaced on ¾-inch centers although closer or wider spacing may be used in alternative embodiments. The spacing of the lenses determines the maximum vertical dimension of an object which may be inserted between the light source 20 and the receiver 22 without actuating the system.

An intermediate vertical frame member 34 is supported behind the lens frame member 30. The frame member 34 is supported vertically, parallel to the frame member 30 along the principal axes of the lenses 28. The frame member has a plurality of small holes 32 spaced along its length, with one hole 32 aligned along the principal axes of each one of these lenses 28.

A receiver focal plane frame 36 is supported vertically parallel to the frames 30 and 34 at a spaced distance beyond the frame 34 from the frame 30. The surface of the frame 36 closest to the frame 34 is preferably disposed on or about the common focal planes of the lenses 28.

A plurality of optically conductive fiber strands 38 are fitted through horizontal holes formed in the focal plane frame 36 from the side opposite to the frame 34, so that their ends terminate closely adjacent to the focal plane surface of the frame 36. These termination points are spaced in a one-to-one relationship with the lenses 28 and the apertures 32 so that each fiber strand 38 is disposed in the focal plane of one of the lenses 38 and the associated aperture 32 is disposed between the two and acts as a filter to prevent light from any of the other lenses from reaching that associated fiber element. The apertures 32 also prevent light from sources displaced transversely relative to the plane between light source 20 and the receiver 22 from reaching the fiber optic strands.

Each of the lenses 28 is effectively focused at infinity and accordingly at one point on the fluorescent lamp 26. The lamp 26 effectively acts as would a plurality of discrete light sources, each located at the intersection of the principal axis of one of the lenses 28 and the lamp 26.

The fiber optic strands 38 are flexible and have their other ends connected to a commutator, generally indicated at 40 and illustrated in FIG. 3, which is supported within the control box 24. The ends of the fiber optic strands are supported in a circular array in holes 42 formed through the thickness of a stationary commutator disc 44. Thus the ends of the optically conductive fibers are flush with the forward face of the commutator disc as seen in FIG. 4. The stationary disc 44 is affixed to a supporting structure 46 which also retains an electric drive motor 48. The shaft 50 of the motor passes through the central aperture in the disc 44 and is journalled therein by anti-friction bearings 52. It passes through the central aperture formed in a rotating commutator disc 54 and terminates in a section journalled in another anti-friction bearing 56 supported on mount 58.

The rotary disc 54 is approximately the same diameter as the stationary disc 44. A single fiber optic strand 60 has one end supported in the face of the rotary disc 54 that abuts the face of the stationary disc 44 at the same radius as the fiber optic elements 38. Thus the end of the element 60 is brought into abutment with the ends of the element 38 successively as the disc 54 rotates.

The scanning strand 60 extends radially to the center of the shaft 50 and then passes through the center of the shaft so that its end 62 is flush with the end of the shaft 50. A photo-multiplier tube 64 is supported within the mount 58 so as to be exposed to light emanating from the end 62 of the fiber optic element 60. As the disc 54 rotates and the strand 60 is brought successively into alignment with the ends of the strands 38 arrayed about the stationary disc 44, any light passing through these strands is carried by the element 60 to the photo-multiplier tube 64. In this manner the photo-multiplier tube 64 effectively scans the light picked up by the ends of the fiber strands 38 disposed in the focal plane of the lenses 28.

The rotary disc 54 has a pair of circumferential slots 66 formed in its perimeter and a circumferentially sawtoothed section 68, best seen in FIG. 5, is formed between slots 66. The saw-toothed section 68 runs around the full perimeter of the rotary disc. An optical limit switch 70 consisting of a light emitting diode 72 and a photodetector 74 spaced from one another by a slot 76. Optical limit switches of this type are commercially available in the form of single integrated units. For example, Monsanto Chemical Company produces an optical limit switch of this type employing a galium arsonite infra-red light emitting diode and a silicon photo-Darlington detector.

The unit 70 is positioned with the light source 72 and the detector 74 disposed in the two slots 66 so that the sawtoothed section 68 extends in the space 76 between the light source and the detector. Accordingly, as the disc 54 rotates, the light from the source 72 is alternately passed and blocked with respect to the detector 74 and the detector provides a sawtoothed output voltage in timed relation to the rotation of the disc, with each pulse representing a coincidence between the scanning strand 60 and one of the strands 38.

Referring to FIG. 7, the control circuit for the system receives the output of the photo-multiplier tube 64 and the optical limit switch detector 70 and operates upon these signals to develop appropriate control signals to disable the press 10 when an obstruction is detected in the area bounded by the light source 20 and the light receiver 22.

The anode of the photo-multiplier 64 is coupled by a capacitor 80 to the gate of a field effect transistor (FET) 82. A positive voltage is applied to the photo-multiplier through a resistor 84. A zener diode 86 connected between the gate of the FET and ground potential protects the photo-detector against pulses and a resistor 88 connected between the gate of the FET and ground biases the gate. A bias voltage is applied to the FET through a resistor 88.

The FET is normally conductive but when light falls on the photo-multiplier 64 so as to provide a relatively high negative voltage on the gate of the FET, it is rendered non-conductive and its output goes high. The resultant positive going signals are fed into three shift registers 90, 92 and 94 connected in series, with the output of one shift register representing the input of the next.

The sawtoothed wave form generated by the light detector 74 of the optical limit switch 70 is provided to a one-shot multi-vibrator 96 and the outputs of this multi-vibrator, termed the "clock line" are fed to each of the shift registers 90, 92 and 94 to cause them to shift the signals provided by the photo-multiplier. The outputs of all three of the shift registers are connected to a NOR gate 98.

The clock line advances the signal representing the outputs of the photo-detector 64, as converted into either high or low signals by the FET 82, in timed relation to the rotation of the commutator disc 54. Each time one of the spaced areas between the sawteeth 68 falls within the gap 76 of the optical limit switch 70, signifying that the scanning optic strand 60 is in coincidence with one of the fiber strands 38 supported on the stationary commutator disc 44, the signal at the output of the FET 82 is introduced into the first stage of the shift register 90 and the contents of all of the shift registers are advanced. After a full revolution of the disc 54 a signal introduced at the beginning of the shift register 90 will emerge therefrom and be fed into the first stage of the shift register 92 and also to the NOR gate 98. At the same time, a signal will be provided by the output of the shift register 92 to the input of the shift register 94 and to the NOR gate 98, which represents the condition of the photo-multiplier 64 when scanning the same fiber optic strand 38 during the previous revolution.

Accordingly, since the registers 90, 92 and 94 each contain a number of stages equal to the number of sawteeth 68 on the rotor 54, and the number of strands 38, the signals that emerge from the three of them at one time are all representative of the output of the same fiber optic element 38 and accordingly of the condition of the light path as sensed by one of the lenses 28.

These signals are all provided to the NOR gate 98. The output of the NOR gate remains low unless three low inputs are received simultaneously. A single low input represents the fact that the light path sensed by one of the lenses 28 is blocked at the time of scanning. If all three outputs of the shift registers are low simultaneously, that indicates that a particular light path has been blocked during three successive rotations of the disc 54. This introduces a safety factor to the system. It prevents an alarm condition from being registered because of an accidental electrical noise pulse. It opens up the possibility of something moving through the light curtain at sufficient speed to fail to trigger the alarm, but the speed of rotation of the motor 48 is sufficient to make this possibility meaningless.

Accordingly, the output of the NOR gate 98 is normally low and only goes high when a particular light path as sensed by a lens 28 is blocked for three successive rotations of the disc 54. This high signal is provided to a NAND gate 100 along with the inverted output of the clock line as provided by inverter 102. NAND gate 100 divides a high output of the NOR gate 98 which may last through more than one clock period into a plurality of pulses equal to the number of blocked light paths detected by the NOR gate 98. For example, assume that three adjacent light paths sensed by three adjacent lenses 28 are all blocked for the same three periods. The output of the NOR gate 98 will then be high for three clock times. The output of the gate 100 will be three separate shorter negative-going pulses. These are inverted by an inverter 104 which accordingly only provides a positive-going output pulse when an error is detected.

These error signals are provided to a decimal counter module 106. The carry outputs representing over-flows of decimal counter 106 are provided to a second decimal counter 108.

Both of these decimal counters are initially reset to zero by the output of a binary counter 110 fed by pulses from the clock line. The counter has a capacity equal to the number of lens systems (32 in the preferred embodiment). The 32-bit binary counter has its output fed through a delay circuit 112 which feeds its reset so that at the end of 32 bits, signifying one complete revolution of the scan disc 54, the output of the counter 110 is high for a short period and then it is reset. The same reset signal resets the decimal counters 106 and 108.

During the time between the resets the error signals as developed by the NAND gate 100 are counted in the counters 106 and 108. The outputs of the counters 106 and 108 are provided to two sets of decimal thumbwheel switches 114 and 116. The switches 114 are associated with the counter 106 and the switches 116 are associated with the counter 108. These switches are manually preset to a number indicative of the number of light paths associated with particular lenses 28 which are blocked by permanent installations in the die path. For example, if a permanent loading mechanism in the die area permanently blocked the light from the lamp 26 from reaching eight of the lenses 28, the thumb wheel 14 would be set to eight and the thumb wheel 116 would be set to the number zero. The thumb wheels act to compare the number of errors developed during a revolution of the disc 54, as counted in the units 106 and 108, with their preset number indicative of how many blocked lenses should be detected. The outputs of the switches 114 and 116 are high when the numbers set in them accord with the outputs of the switches 106 and 108, and low otherwise.

Their outputs are provided to a NAND gate 120 which accordingly will have a low output when both of the inputs are high and high otherwise. The output of the NAND gate 120 is provided to the J input of a J-K flip-flop 122 and an inverter 124 connects the J input to the K input of that flip-flop. The clock input for the flip-flop comes from the output of the 32-bit binary counter 110 so that effectively the condition of the NAND gate 120 is only sensed at the end of the 32-bit count. If the NAND gate has a high signal at that time the flip-flop 122 is set. The two outputs of the flip-flop 122 are provided to the J and K inputs of a second flip-flop 126 which is also clocked by the output of the 32-bit counter 110. If flip-flop 122 becomes set at the end of one rotation of the disc, at the end of the next rotation the flip-flop 126 is set. If at the end of that second rotation another high signal is introduced by the NAND gate 120, signifying another discrepancy between the count stored in the counters 106 and 108 and the number set in the limit switches 114 and 116 during that second rotation, the flip-flop 122 is also set. Accordingly, if the miscount occurs for two sequential revolutions, both the flip-flops 122 and 126 will be set at the end of those two revolutions. This is another safety factor similar to that provided by the registers 92 and 94, and an alarm condition with respect to the number of counts is signified only when this miscount occurs for two revolutions.

The set outputs of the flip-flops 122 and 126 are provided to a NAND gate 128. If both outputs are high the output of the NAND gate goes low and that signal is inverted by an inverter 130 and provided to a NOR gate 132. The other input to the NOR gate comes from a missing pulse detector circuit, generally indicated at 134. This circuit operates to detect an improper pulse series on the block line due to freezing of the commutator disc 54 or other circuit failure. The clock line pulses are first provided to an inverter 136. The output of the inverter is provided to the base of an NPN transistor 138 which has a ground emitter. Its collector is connected to a capacitor 140 which is in series with a resistor 142 across the power supply.

The capacitor 140 is normally charged through the resistor 142 since the transistor 138 is normally not conductive. When a negative going clock pulse occurs and is inverted with inverter 136 the transistor 138 becomes conductive and discharges the capacitor 140. The voltage across the capacitor 140 is continually compared with a reference voltage in a comparator 144. When the capacitor voltage exceeds the reference voltage, indicating an absence of clock pulses for some period of time, the output of the comparator goes high and sets a one-shot multi-vibrator 146. The output of this one-shot multi-vibrator provides a second input to the NOR gate 132.

The output of the NOR gate accordingly is normally high and goes low when either of its input signals go high, and this output is provided to another NOR gate 150. The other input to the NOR gate 150 is the inverted output of a power on signal from unit 152. This same signal resets the flip-flops 122 and 126. The NOR gate 150 drives an alarm 154. The alarm unit is suitably connected to the press to actuate a brake and to deenergize the press.

The alarm may be continuous until manually reset or may exist only until the conditions which set off the alarm are removed.

An alternate technique for scanning a plurality of light beams extending between a single elongated source and a plurality of lens elements focused at spaced points on that source is disclosed in FIG. 8. The light source may constitute an elongated fluorescent tube 200. A receiver frame member 202, spaced at the opposite end of the danger area from the lamp 200, contains a plurality of double convex lenses 204 which are supported at spaced intervals so that their principal axes intersect spaced points on the lamp 200. A number of optic fiber strands 206, equal in number to the number of lenses, each have one of their ends fixed in a focal plane receiver panel 208. A spacial filter element 210, imposed intermediate the receiver panel 202 and the focal plane panel 208 contains a number of apertures 212 aligned along the principal axes of the lenses 204. Thus, as in the first embodiment of the invention, each of the lenses 204 focuses lamp 200 on one of the optical strands 206 and the light is filtered and shielded by passage through the intermediate aperture 212.

Unlike the system of the first embodiment of the invention, all of the optical strands 206 have their other ends connected to a common point 214 at the window of a photodetector 216. Accordingly the photodetector 216 continually receives the light output of all of the fiber strands 206 simultaneously. As a replacement for the commutator used to scan the light paths of the first embodiment of the invention, a plurality of shutters 218 are associated with the light paths between each of the apertures 212 and the associated ends of the fiber optic strands 206. These shutters normally block the passage of light to the fiber optic strands but can be actuated by signals from a scanner 220 to allow the passage of light. The scanner serially energizes the shutter 218 so that one is opened at a time and the photodetector 216 effectively examines the light path associated with the opened shutter at any instant. The output of the photodetector 216 as well as the scanner 220 are provided to a control unit 222 which analyzes the signals and provides an output control signal.

The shutters 218 may be of the electromechanic type but could be of the electronic type such as Kerr cells. This latter type eliminates the use of any moving parts in the system.

Figure 9:
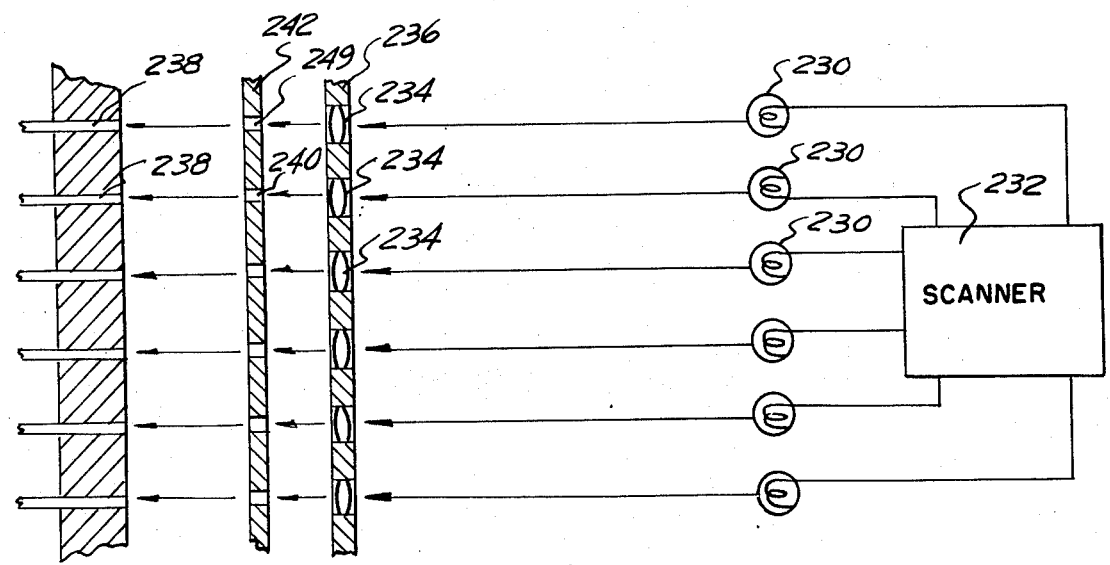
FIG. 9 is a schematic diagram of another alternative embodiment of the invention wherein discrete scanned light sources are employed.

Another alternative arrangement is disclosed in FIG. 9. In this case the light source takes the form of a plurality of lamps 230, spaced from one another and energized by a single scanning power supply 232 which energizes the lamps sequentially. The lamps 230 might be photo-diodes or other solid state light sources. A plurality of lenses 234 are positioned in a frame 236 so that their principal axes each intersect one of the light sources 230. Fiber optic strands 238 are associated with the lenses 234 and filtering apertures 240, formed on an intermediate frame 242 are disposed between each lens and its associated strand. All of the fiber optic strands 238 are again connected to a common photodetector and the scanning derives from the sequential energization of the light sources 230 by the scanner 232.

Having thus described my invention, I claim:

1. A safety device of the type described, comprising: a constant radiation source, a plurality of radiation receivers; a single radiation detector; means for causing the radiation detector to sequentially monitor the conditions of the radiation receivers; means for developing timing signals in timed relation to the monitoring of individual radiation receivers by the radiation detector; a plurality of shift registers connected serially, having the outputs of the radiation detector provided as an input to the first register in the serial chain and the timing signals connected to advance the contents of all of the registers; means for simultaneously receiving the outputs of all of said shift registers and for generating an alarm signal upon the occurrence of a particular pattern in the outputs from said shift registers.

2. The device of claim 1 wherein the shift registers each contain a number of stages equal to the number of radiation receivers.

3. The device of claim 1 further including means for receiving the output of said means for simultaneously receiving the output of all of the shift registers and for counting the number of output signals received from said means during a predetermined period of time.

4. The device of claim 3 wherein said predetermined period of time is equal to the time required for the radiation detector to determine the condition of all of the radiation receivers.

5. The device of claim 4 further including switch means for presetting a number into said device and means for comparing said number with the number of error signals counted in said predetermined period of time.

6. The system of claim 3 wherein said means for counting said output signals has a capacity equal to the number of radiation receivers; and including means for resetting said counter upon the occurrence of an overflow, whereby said predetermined period of time is the time period between two overflows of said counter.

* * * * *